United States Patent [19]

Bauer et al.

[11] Patent Number: 5,333,099
[45] Date of Patent: Jul. 26, 1994

[54] ELECTRICAL COMPONENT HAVING A SANDWICH-LIKE SUB-ASSEMBLY

[75] Inventors: Karl-Heinz Bauer, Bad Neustadt; Ulrich Brüggemann, Heustreu, both of Fed. Rep. of Germany

[73] Assignee: Preh-Werke GmbH & Co. KG, Bundesrepublik, Fed. Rep. of Germany

[21] Appl. No.: 141,026

[22] Filed: Oct. 25, 1993

[30] Foreign Application Priority Data

Oct. 28, 1992 [DE] Fed. Rep. of Germany ....... 4236353

[51] Int. Cl.⁵ .......................... H05K 7/02; H02B 1/01
[52] U.S. Cl. .................................... 361/760; 361/809; 361/825
[58] Field of Search ............... 361/728, 730, 736, 740, 361/760, 761, 763, 769, 807, 808, 809, 810, 825; 257/680, 681; 29/832, 834, 835

[56] References Cited

U.S. PATENT DOCUMENTS 4,739,452 4/1988 Fukunaga ............................ 361/809
5,117,330 5/1992 Miazga ................................. 361/825

FOREIGN PATENT DOCUMENTS 881912   6/1980  Belgium .
0493071  7/1992  European Pat. Off. .
3247531 12/1983  Fed. Rep. of Germany .
8705715 10/1987  Fed. Rep. of Germany .
8805722  7/1988  Fed. Rep. of Germany .
3726225  8/1988  Fed. Rep. of Germany .
8801014  7/1989  Fed. Rep. of Germany .
4105505  9/1992  Fed. Rep. of Germany .

Primary Examiner—Leo P. Picard
Assistant Examiner—Bot Ledynh
Attorney, Agent, or Firm—Griffin Butler Whisenhunt & Kurtossy

[57] ABSTRACT

A simplified construction is suggested for an electrical construction assembly, or an assembled electrical component, having a circuit board, a liquid crystal display, a light conductor, and a sheet-metal screen. In this regard, a leg of the sheet-metal screen extends about one edge of the circuit board and effects, on the one hand, a secure contacting of the liquid crystal display and, on the other hand, in an uncomplicated manner, a releasable clamping together of the assembly.

8 Claims, 2 Drawing Sheets

ELECTRICAL COMPONENT HAVING A SANDWICH-LIKE SUB-ASSEMBLY

BACKGROUND OF THE INVENTION

The invention concerns an electrical construction assembly, or an assembled electrical component, having a liquid crystal display on a circuit board with a sheet-metal screen for receiving, or retaining, the other elements and holding them together.

Such an electrical component is described in Belgium Patent Document 881 912. A combination comprising a circuit board, a liquid crystal display as well as contacts and spacers is effectively held together by a sheet-metal screen. In this regard, the sheet-metal screen overlaps the combination on three edges thereof, with a fourth edge serving as a terminal contact connection. Even with this mechanically very stable arrangement, there is, in retrospect, a recognizable defect which is expensive to eliminate and usually leads to, in this type of construction, a loss of the component.

A circuit board with a screwed on light conductor is disclosed in German Patent 32 47 531 A1. The light conductor supports on its upper surface a plurality of liquid crystal indicators to which ribs of the light conductor assign particular positions.

Electrical components of this type are often encountered on electrical apparatus, or appliances. For example, they are often behind apparatus front walls which frame an information surface of the liquid crystal's viewing side. Often, such front walls are additionally provided with keys, or switches, which allow, for example, a user to influence information read from the liquid crystal. Such keys, and possibly additional component elements, such as resistors, condensers, diodes, integrated circuits and so forth, as well as also light conductors with light sources, are often combined with a liquid crystal display on a common circuit board.

Known assembled electrical components are provided with a sheet-metal screen to reduce influences of thermal or electrical radiation. For electrical components, or construction assemblies, which are assembled at a place or time different from an end product, or for appliances whose front walls, including electrical components, are intentionally removable—for example for reasons of protecting against theft of car radios—sheet-metal screens of the components are also used as, and sometimes even predominantly, mounting frames for the components themselves or for holding and stiffening the components.

In order to hold a liquid crystal display on a circuit board, customized receivers for these types of displays are often used. Such a receiver includes a number of contact elements which elastically contact the liquid crystal display and, with correspondingly provided contact surfaces, link with, for example, a circuit board. Contact elements can also be formed as conductive rubber strips with alternating adjacent electrical insulators and conductor segments. A necessary pressure between the contact elements and the contact surfaces of the liquid crystal display to achieve a problem-free contact is created either by an appropriate shaping of the contact elements, for example forming a fork spring of the contact elements themselves, or by means of an addition holder or framing part mounted on the receiver. (DE-C1-37 26 225, DE-A1-41 05 505, EP-A2-0 493 071, DE-U-87 05 715, DE-U-88 01 014, DE-U-88 05 722). With such an arrangement for releasably holding a liquid crystal display on a circuit board, additional parts are always necessary which serve to hold the contact elements or the liquid crystal display in proper positions or to ensure good contacts upon providing background illumination of the liquid crystal display.

It is therefore an object of this invention to provide an assembled electrical component with a circuit board, a liquid crystal display, a light conductor, and a sheet-metal screen which, with regard to its mechanical structure, can be effectively fabricated without the necessity of additional parts and with small expenditures, and which can be maintained in this assembled configuration for, for example, operational inspection or for interim storing as well as for transportation to final mounting, and which, according to requirements, can be disassembled with an equally small expense.

SUMMARY

According to principles of this invention, a sub-assembly of an assembled electrical component is held together only at one edge thereof by a sheet-metal screen while an opposite edge thereof clampingly abuts a bend flange of the sheet-metal screen, with an end portion of the sheet-metal screen having a flexure therein running parallel to the one edge which springingly engages the sub-assembly at a position spaced from the one edge. This electrical component is, in a preferred manner, assembled without tools to be self retaining; it is effective in operation and can be tested, transported and stored; and it can, according to requirements, be dismantled again without the use of tools.

BRIEF DESCRIPTION OF THE DRAWINGS

The foregoing and other objects, features and advantages of the invention will be apparent from the following more particular description of the preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENTS

Figure 1:
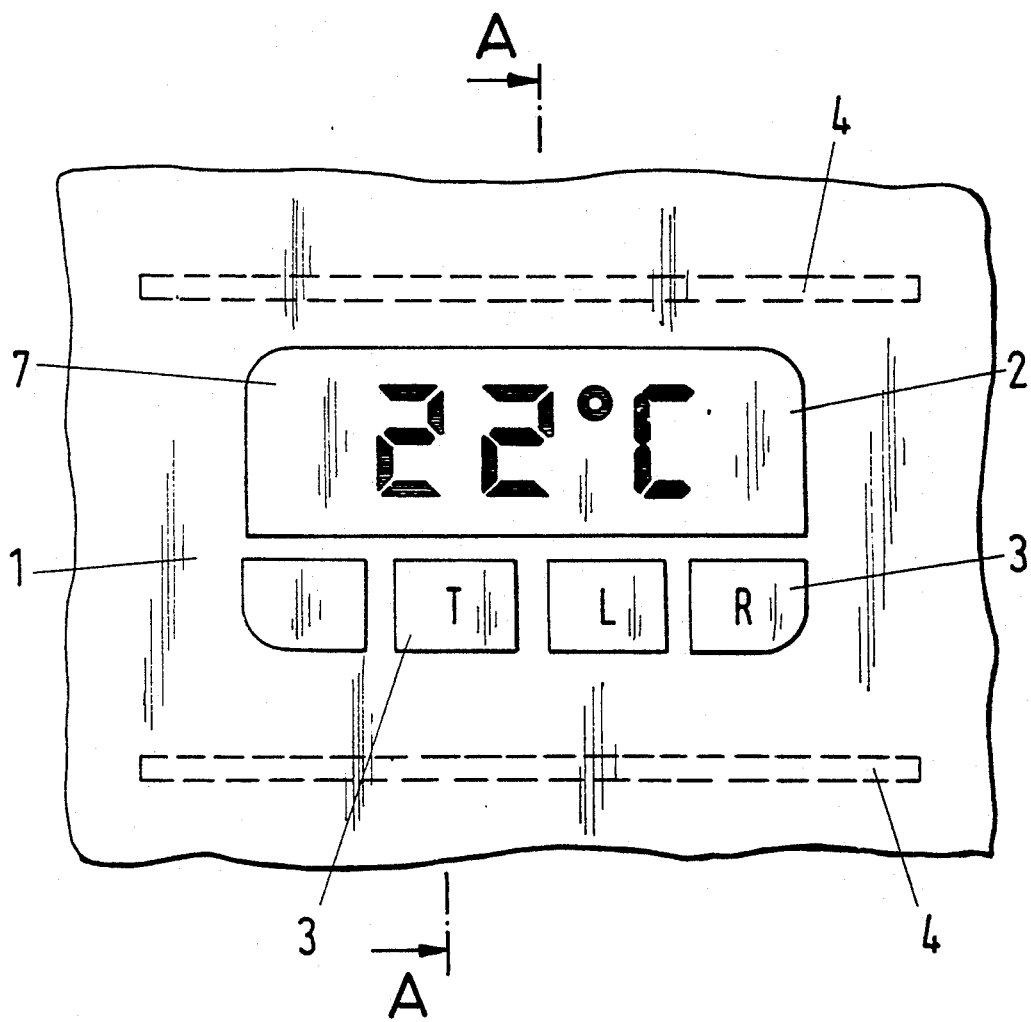
FIG. 1 is an outer front view of a front wall of an appliance with control keys and a liquid crystal display of an associated electrical component of this invention.

FIG. 1 shows a front wall of a not-otherwise-shown electrical appliance, or device, when seen during operation. The front wall 1 has a window 2 at which retrievable information which can be called-up by means of keys 3 can be seen. The front wall 1 is attached to the electrical appliance by flanges 4 provided on the backside thereof. The flanges 4 are also used to hold, or mount, an electrical construction assembly, or assembled component, 5. The component 5 has a liquid crystal display 6 whose indicator surface 7 is at the window 2 of the front wall 1.

Figure 2:
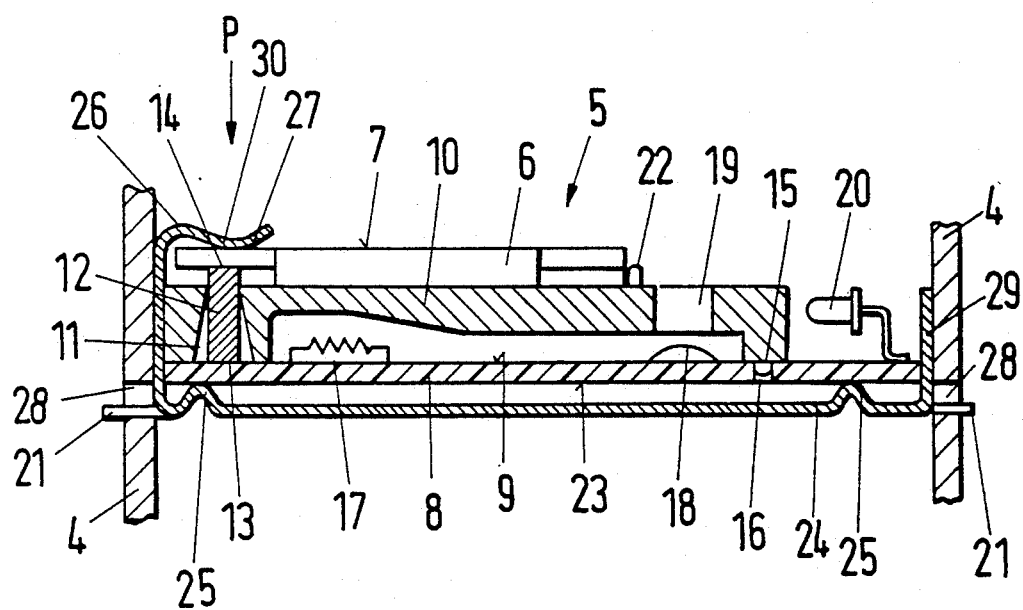
FIG. 2 is a cross-sectional view taken on line A—A in FIG. 1.

The electrical component 5 includes as a sub-component mainly a circuit board 8 with electrical elements thereon, a light conductor 10, and the liquid crystal display 6. The circuit of the circuit board 8 is electrically coupled to the electric appliance via coupling devices which are not shown (FIG. 2). The circuit board 8 supports on an upper side 9, directed toward the front wall 1, the light conductor 10. The light conductor 10 holds, in a slightly conically shaped, window-like, recess 11, which diverges toward the circuit board 8, a conducting rubber strip 12. The conducting rubber strip 12 has one contact surface 13, lying in common with the light conductor 10, on the circuit board 8, with its opposite contact surface 14 extending above the light conductor 10. For a long contact row, one can choose to have more window-like recesses 11 and corresponding separated conductive rubber strips 12. Conductive rubber strips 12 are known in the trade, or are off-the-shelf items; they comprise electrically conducting and electrically insulating portions which are aligned lengthwise of the conductive rubber strips to be adjacently alternately spaced, by small tenths of millimeters, apart. The light conductor 10 is engaged in a bore 16 on the circuit board by means of an integral pin 15 to ensure against sliding. On an upper surface 9 of the circuit board 8, according to need, available surface area and room, a circuit is arranged including, for example, resistors 17; switching contacts 18 which are manipulated by means of the keys 3 of the front wall 1 acting through openings 19 in the light conductor 10; and a lamp 20 whose light is fed to the light conductor 10. A liquid crystal display 6 is arranged on the light conductor 10, spaced from the circuit board 8. The terminal surfaces, or electrical contact surfaces, of the liquid crystal display 6 lie thereby on the opposite contact surface 14 of the conducting rubber strip 12 and, via its electrically conductive portions, are coupled to the circuit board 8. Flanges 22 formed on the light conductor are arranged to correspond to a contour of the liquid crystal display 6 and thereby designate its desired position. The liquid crystal display is protected against sideward sliding movement by the flanges 22.

In addition to the sub-component, the assembled component 5 includes a sheet-metal screen 24 that receives the sub-component and that extends approximately parallel to an underside 23 of the circuit board 8 of the sub-component and which, by means of corrugations 25, props against this underside. A leg 26 of the sheet-metal screen 24 extends about one edge of the circuit board 8. A bowed flexure, or bend, 30 in an end portion 27 of the leg 26 lies in a line parallel to terminal, or contact, surfaces of the liquid crystal display 6, approximately at a level of, or in line with, the conducting rubber strip 12, on the liquid crystal display 6 and produces a required pressure P for ensuring a secure contact. If the line of contact of the end portion 27 is spaced further from an edge of the circuit board 8 than is a corrugation 25 directed toward the end portion on the underside of the circuit board, a lever effect is created which clampingly holds together the arrangement of the electrical construction assembly, or assembled component, from opposite directions. The sheet-metal screen 24 is provided with a bend flange 29 at an edge thereof positioned opposite to the leg 26. The spacing of the bend flange 29 from the leg 26 is calculated according to a corresponding measurement of the circuit board 8 to be thereby received. The circuit board 8 clampingly abuts on the bend flange 29. The thusly-provided mechanical union, or interengagement, of the assembled component 5 easily holds together until a final mounting thereof. The component 5 is held to the front wall 1 by means of outwardly directed tongues 21 of the sheet-metal screen 24 engaging in openings 28 of the flanges 4.

The assembly of the component 5 is carried out by first placing the light conductor 10, with the inserted conductive rubber strips 12, on the separate circuit board 8 and aligning it with the bores 16, then the liquid crystal display 6 is placed on the light conductor 10 and following this the entire packet, representing the sub-component, is shoved under the end portion 27 of the leg 26 while being pivoted. By doing this, the end portion 27 is tensioned, or flexed.

As set forth above, upon fabrication of the assembled electrical component, first the parts of the sub-component, for example the circuit board, the liquid crystal display, and the contacting devices, are combined in the manner of a sandwich. Then the combined sub-component, with its lengthwise edge for providing contact, is shoved, while pivoting, under the end portion of the previously prepared sheet-metal screen. The opposite lying lengthwise edge of the sub-assembly slides, in an end phase of the assembly, along the bend flange 29 of the sheet-metal screen and finally seats itself in a "clamped in" end position. The sheet-metal screen releasably holds the sub-component and simultaneously protects it against undesired mechanical stresses. Special costly devices and tools are not necessary for this assembly procedure and are also not necessary for dismantling the component in a reverse procedure.

According to one embodiment of the invention, the flexure, or bend, is arranged across from and coordinated with a corrugation in the sheet-metal screen. The mounted sub-component is positioned on the corrugation. The oppositely arranged corrugation and flexure make it easier to place the sub-component below the end portion and reduces stretching loads, which arises therefrom, on the end portion.

The sheet-metal screen and its end portion, together, have the effect of an elastic clamp which, for one thing, ensure good contact and, for another thing, holds the arrangement of the component together. A separate part for specially attaching the liquid crystal display is not necessary.

In a further embodiment of the invention, the circuit board and the light conductor, as well as the light conductor and liquid crystal display, are, by appropriate precautions, easily alignable with one another. Holding the conducting rubber strips, which are suggested as contacts, within the light conductor particular simplifies construction of the component.

While the invention has been particularly shown and described with reference to a preferred embodiment, it will be understood by those skilled in the art that various changes in form and detail may be made therein without departing from the spirit and scope of invention.

The embodiments of the invention in which an exclusive property or privilege are claimed are defined as follows:

1. An assembled electrical component having a sandwich-like sub-assembly which comprises at least a circuit board, a liquid crystal display, and a device to mount and make contact with the liquid crystal display, and having a sheet-metal screen on a rear side of the sub-assembly for receiving the sub-assembly, with a holding end portion of the sheet-metal screen extending about an edge of the sub-assembly for holding the sub-assembly together;

wherein the sub-assembly is only held together along one edge thereof while at an opposite edge it clampingly abuts on a flange bend in the sheet-metal screen and wherein the holding end portion of the sheet-metal screen has a flexure therein which springingly engages the sub-assembly at a position spaced from an edge of the sub-assembly.

2. An assembled electrical component as in claim 1 wherein the sheet-metal screen has, at a backside of the sub-component, at least one corrugation for supporting the sub-component arranged across from to the flexure.

3. An assembled electrical component as in claim 1 wherein a light conductor with an opening for holding a contact element is included for making electrical contact between the liquid crystal display and the circuit board.

4. An assembled electrical component as in claim 3 wherein the contact element is a conducting rubber strip.

5. An assembled electrical component as in claim 1 wherein the flexure presses against the sub-component at a level of electrical contact.

6. An assembled electrical component as in claim 1 wherein the circuit board of the sub-component abuts on the bend flange.

7. An assembled electrical component as in claim 1 wherein the circuit board has bores therein about whose edges a light conductor is supported and in which pins engage to prevent sliding of the light conductor.

8. An assembled electrical component as in claim 1 wherein a surface of a light conductor supports the liquid crystal display at designated areas spaced from the circuit board.

* * * * *